United States Patent [19]
Curran et al.

[11] Patent Number: 5,142,208
[45] Date of Patent: Aug. 25, 1992

[54] CURRENT SENSING METHOD AND APPARATUS FOR A MULTI-PHASE BRUSHLESS DC MOTOR

[75] Inventors: Kevin S. Curran, Broomfield; James C. Faulk, Longmont; Philip L. Lloyd-Davies, Louisville; Steven G. Trabert, Boulder, all of Colo.

[73] Assignee: Storage Technology Corporation, Louisville, Colo.

[21] Appl. No.: 736,632

[22] Filed: Jul. 26, 1991

[51] Int. Cl.$^5$ ............................................. H02P 6/02
[52] U.S. Cl. ...................................... 318/254; 318/138
[58] Field of Search .......................... 318/138, 254, 439

[56] References Cited

U.S. PATENT DOCUMENTS

| | | | |
|---|---|---|---|
| 4,417,200 | 11/1983 | Weintraub et al. | 323/347 |
| 4,528,486 | 7/1985 | Flaig et al. | 318/254 |
| 4,535,276 | 8/1985 | Yokobori | 318/254 |
| 4,608,524 | 8/1986 | Yokobori | 318/254 |
| 4,617,499 | 10/1986 | Yuasa | 318/254 |
| 4,631,458 | 12/1986 | Furuichi | 318/254 |
| 4,677,356 | 6/1987 | Tsuneda et al. | 318/258 |
| 4,701,683 | 10/1987 | Kikkawa | 318/254 |
| 4,713,590 | 12/1987 | Ohno | 318/254 |
| 4,749,923 | 6/1988 | Chieng | 318/269 |
| 4,879,498 | 11/1989 | Shinohara et al. | 318/254 |
| 4,922,169 | 5/1990 | Freeman | 318/254 |
| 5,043,643 | 8/1991 | Hedlund et al. | 318/254 |

OTHER PUBLICATIONS

Thomas J. Sokira and Wolfgang Jaffe, "Brushless DC Motors-Electronics Commutation and Controls", Tab Books Inc. 1990, pp. 169-217.

*Primary Examiner*—Bentsu Ro
*Attorney, Agent, or Firm*—Dorr, Carson, Sloan & Peterson

[57] ABSTRACT

Method and apparatus for monitoring bi-directional currents in a multi-phase brushless DC motor. The current in each separate phase is separately monitored to generate a feedback signal that is used to dynamically adjust the instantaneous levels of the winding currents in accordance with a specified torque required of the motor. Both negative and positive currents in the motor windings are monitored at all times to provide precision control of the feedback signals.

14 Claims, 5 Drawing Sheets

CURRENT SENSING METHOD AND APPARATUS FOR A MULTI-PHASE BRUSHLESS DC MOTOR

FIELD OF THE INVENTION

This invention relates to the control of currents and torque in multi-phase brushless DC motors.

BACKGROUND OF THE INVENTION

Brushless DC motors are finding increased use in specialized fields such as servo motors, magnetic tape drives, magnetic disk drives, and other applications in which it is desirable to control with precision the motor current and torque. At times, it is desirable that a large current be applied to a motor to rapidly accelerate it to its full speed. In other instances, it is desirable that the motor be stopped by applying a braking current to the motor. Precision control of the stopping and starting currents is required in order to achieve these objectives, while at the same time, preventing the currents from exceeding levels that could damage the motor or control circuit elements such as power transistors and other solid state devices.

It is known to use specialized circuitry for controlling motor currents. The book entitled, "Brushless DC Motors Electronic Commutation and Controls," by Thomas J. Sokira and Wolfgang Jaffe, 1st Ed., 1990, published by Tab Books, Inc. shows in FIG. 6-1 on page 170 the elements of a current control system for a three-phase brushless DC motor. FIG. 6-29 on page 210 shows further details of motor current monitoring systems. This includes a sampling resistor connected in a path common to all phases of the motor to monitor the total motor current. While the circuitry of FIG. 6-29 does monitor the total motor current, it is less than optimum since it is sometimes desirable to monitor the currents in each separate phase of the motor. FIG. 6-28 of the above publication on page 209 shows circuitry which permits the current in each phase to be individually monitored. This is done by using a low valued sensing resistor in each leg and by monitoring the voltage drop across each sensing resistor to determine the current in each leg. While the circuitry of FIG. 6-28 is advantageous over that of FIG. 6-29 in that it permits the phase currents to be individually monitored, the circuitry of FIG. 6-28 still is less than ideal since it only permits unidirectional currents to be monitored. This is a significant limitation since reverse currents are sometimes encountered during the acceleration, running, and deceleration of a motor. This limitation precludes the optimum control of the current and motor torque required in certain applications for such motors.

It can therefore be seen from the above that it is a problem to accurately monitor currents of all types, including bi-directional currents in the separate phases of multi-phase brushless DC motors. This capability is necessary for one to be able to monitor and control with precision the torque the motor develops and to avoid damaging the motor or the drive circuitry.

SUMMARY OF THE INVENTION

The aforementioned problem is solved and an advance in the art is achieved by the present invention which provides a control system for a brushless DC multi-phase motor in which the currents in each individual phase can be monitored for both magnitude and direction to achieve precision control of the instantaneous motor current and torque. The present invention comprises a monitoring and control system that controls all aspects of the motor's operation during the starting, running, coasting, and braking states of the motor. In accordance with the invention, a low ohmage sensing resistor is associated with each separate phase of a motor in order to provide an output signal representing the instantaneous magnitude and direction of the current in each phase. The separate output signals of the sensing resistors are applied to a circuit which generates a system feedback signal $V_{FB}$ representing the instantaneous motor current in the run mode of the motor. This feedback signal $V_{FB}$ is applied to a pulse width modulator circuit which also receives other signals specifying the manner in which the motor is to be controlled. These other signals include a $V_{limit}$ signal which specifies a maximum permissible motor current. These other signals also include a $V_{command}$ signal which specifies the instantaneous torque it is desired to have the motor generate in the run mode. These other signals further include a brake signal which is applied when the motor is to be braked. The modulator receives the feedback signal $V_{FB}$, the $V_{limit}$ signal, the $V_{command}$ signal and the brake signal and generates an output signal which controls the instantaneous torque the motor is to generate. This output signal is applied to a switch drive circuit which also receives a coast signal, the brake signal as well as a signal indicating the present angular position of the motor rotor. This switch drive circuit receives these signals and generates output signals which control the on/off state of solid state switch elements associated with each phase of the motor.

As shown in the FIG. 6-28 of the aforementioned book by Sokira and Jaffe, there are a pair of solid state switch elements associated with each phase of the motor. These switch elements are controlled by a switch drive circuit to selectively connect the windings of the motor in series between the positive and negative terminals of a power source. These switch elements are controllably switched on and off as the motor rotates with the ratio of the on and off times of these switch elements being effective to control the current applied to each of the series connected windings.

As distinguished from the circuit of FIG. 6-28 of the aforementioned publication, the control system of the present invention senses the direction as well as the magnitude of the current in each motor phase. FIG. 6-28 of the publication shows a sensor element in each phase that can sense only positive going current pulses. In the present invention, the sensor elements sense both positive and negative currents to achieve a more precise control of the motor currents and torque and to allow braking currents to be monitored and safely limited. As is subsequently described, the circuit of the present invention relies upon the inherent parasitic body diodes of the switching elements, if they are mosfets, to permit decaying currents to be generated in various windings when the switching devices of a phase are switched from an on to an off state. During the braking state of the motor, all of the switch elements on the lower half of the control circuit are switched to an on state to brake the motor and terminate its rotation in a manner consistent with the current limitations of the motor and control system components. At these times, reverse currents can flow through the sense resistors to generate negative output signals that are used to control the motor braking currents.

In summary, the present invention solves the aforementioned problem and achieves an advance in the art by providing circuitry which permits improved control of motor torque both for starting, running and stopping by monitoring both the magnitude and direction of the currents instantaneously in each winding of the multiphase brushless DC motor.

DESCRIPTION OF THE DRAWING

These and other advantages and features of the invention may be better understood from a reading of the detailed description of one possible exemplary embodiment thereof taken in conjunction with the drawing in which.

DETAILED DESCRIPTION

Figure 1:
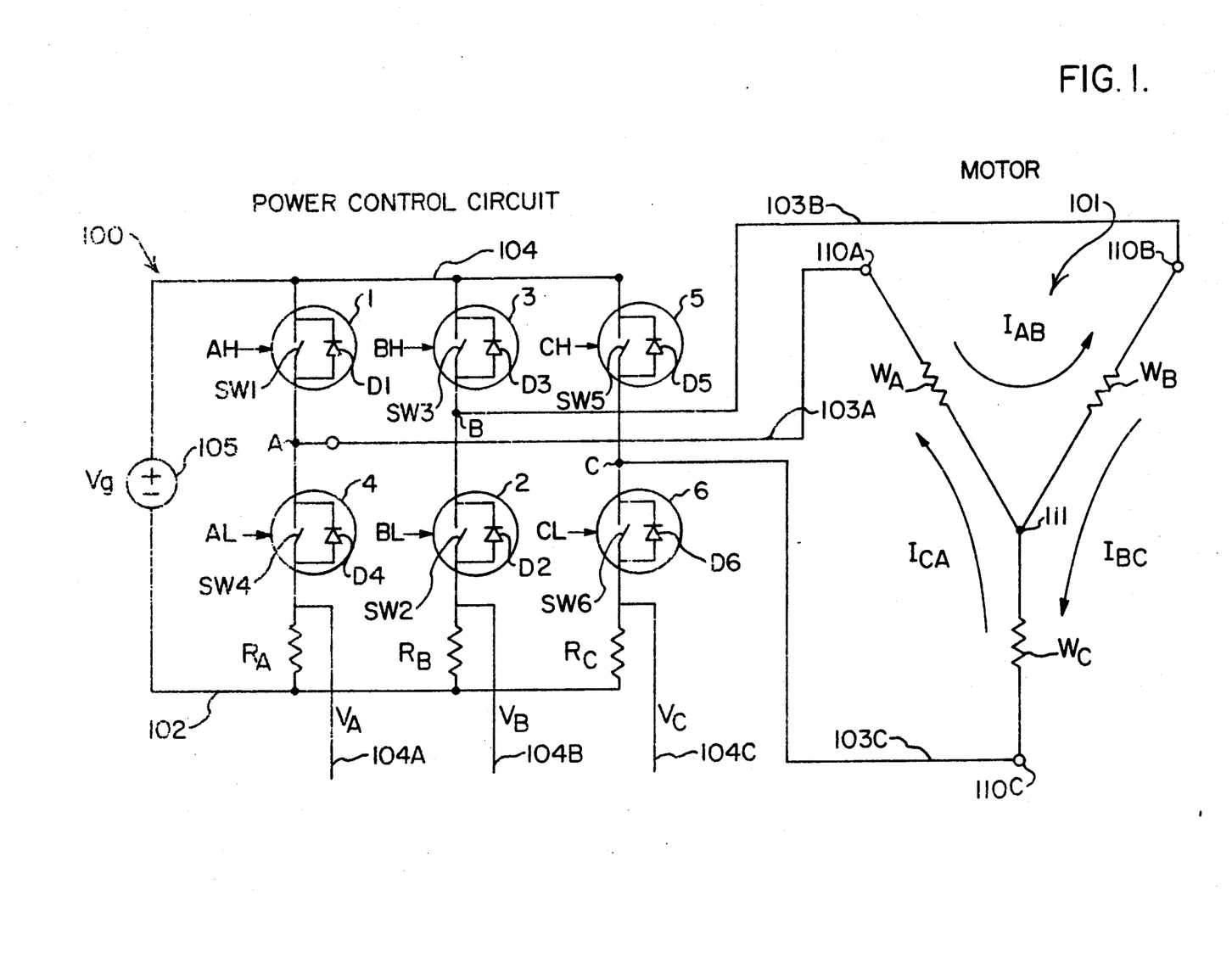
FIG. 1 discloses the details of the circuitry that controls the currents in the motor windings.

The principals of the invention are shown on FIG. 1 which includes a power control circuit 100 and a brushless DC motor 101. The motor is of the multi-phase type and has three windings designated $W_A$, $W_B$, and $W_C$. The three windings are connected over conductors 103A, 103B, and 103C, to the mid-points A, B and C of series connected switches 1 . . . 6 in power control circuit 100. The six switches are connected as series connected pairs with each pair being connected between a positive supply bus 104 and the negative supply bus 102 of source 105. Each switch 1 . . . 6 includes switch contacts SW—, and a diode D— which may either be an inherent part of the switch element or an added diode depending upon the nature of the device used to embody the switch. If the switch elements, are mosfets, then diodes D1 . . . D6 may be the inherent parasitic body diodes of the mosfets devices. If the switch elements comprise power transistors, diodes D1 . . . D6 may comprise added elements in accordance with the operation of the circuit of the present invention. The mid-points A, B, and C of the paired switch elements are connected via conductors 103— to a respective winding of the three phase motor 101. Thus, the mid-point A of series connected switch elements 1 and 4 is connected over conductor 103A to an outer end 110A of winding $W_A$ of motor 101. Each switch element 1 . . . 6 includes a control input, such as AH for element 1 and AL for element 4, which controls the open and closed state of the switch elements. Each series connected switch pair also includes a resistor $R_A$, or $R_B$, or $R_C$, connected in series between negative bus 102 and the lower switch of a pair such as resistor $R_A$ and switch 4.

Motor 101 operates in response to the controllable closing and opening of switches 1 . . . 6 to connect the different windings at different times between positive bus 104 and negative bus 102. The opening and closing of the switches is controlled in a manner that achieves the function the motor is to achieve. In some applications it may be desired to bring the motor from a standing to a running state in a minimum time. In this case, it may be desired to have the motor produce the greatest possible torque and apply the maximum current to the motor windings consistent with safety of the motor and control elements. At other times, the motor may be already running and a high start up torque is not required. Instead, all that is required is the lesser amount of torque required to keep the motor running. In this case, switches 1 . . . 6 are opened and closed a lesser percentage of the time than on the start up operation when high current and high torque is required.

Figure 2:
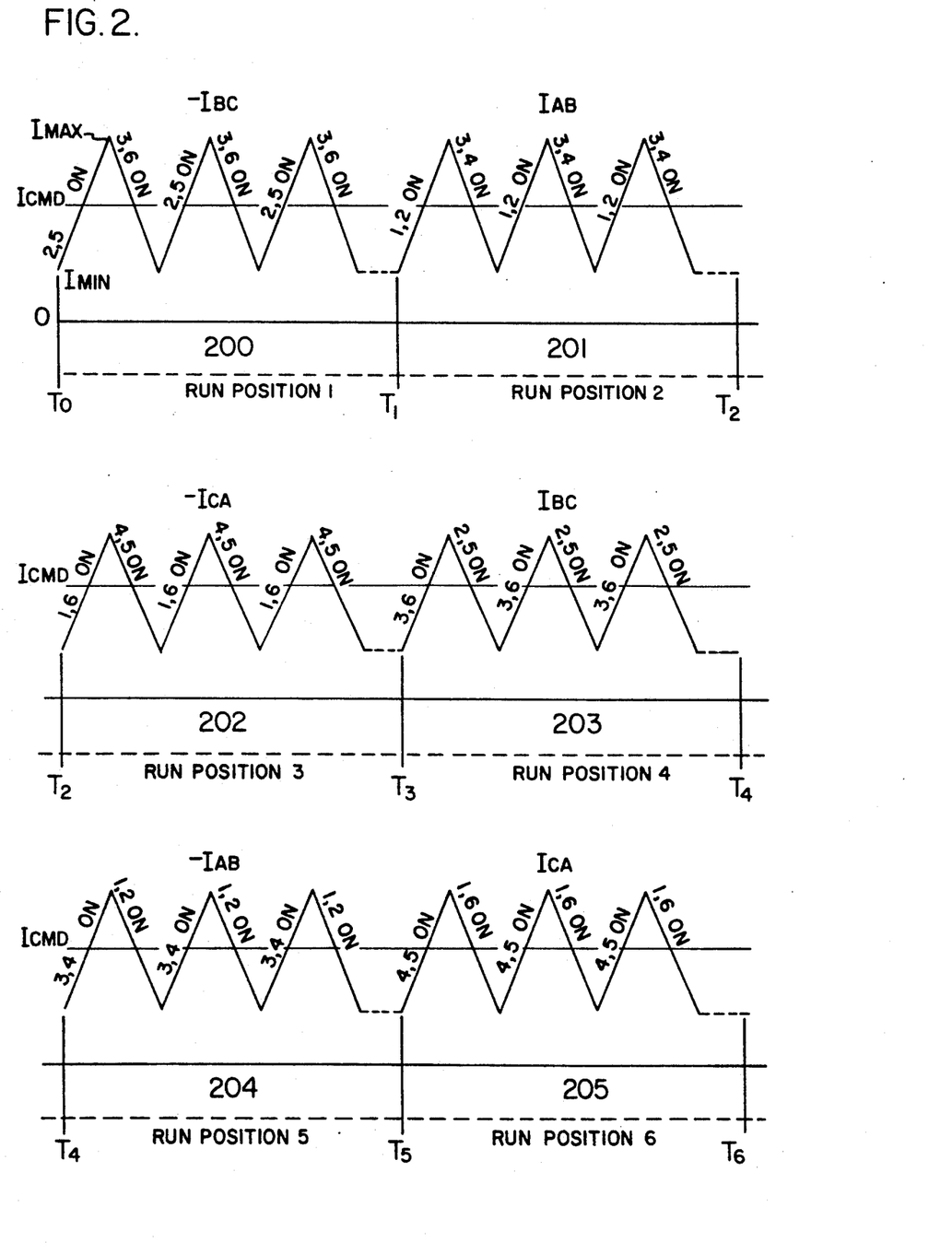
FIG. 2 discloses details of the currents induced in the motor windings during a revolution of the motor rotor.

FIG. 2 shows the currents that are applied to the motor windings on a start up or run operation and indicates which switches are operated at what times to achieve this function. FIG. 2 discloses a complete sequence of currents that are applied for one complete electrical rotation of the motor rotor. The operation of the motor is initiated during Run Position 1 by causing a current $-I_{BC}$ to flow in a counterclockwise direction on FIG. 1 through windings $W_C$ and $W_B$ of the motor. As shown on FIG. 2, this current $-I_{BC}$ is achieved by causing switches 2 and 5 to be closed at time $T_o$ until the current increases from a lower value $I_{min}$ to a higher value $I_{max}$ followed by the opening of switches 2 and 5 and the closing of switches 3 and 6. During the time that switches 3 and 6 are closed, the current decays from $I_{max}$ to $I_{min}$. Following this, switches 3 and 6 are opened and switches 2 and 5 are again closed to cause the current to once again rise from $I_{min}$ to towards $I_{max}$. The cycle proceeds in this manner for the duration of time interval T0 . . . T1. This interval comprises a plurality of sub-intervals in which the current $I_{AB}$ increases from a $I_{min}$ to $I_{max}$, then decreases from $I_{max}$ towards $I_{min}$, then increases again from $I_{min}$ to $I_{max}$ and so on for the duration of the interval T0—T1.

With reference to FIG. 1 and during the time that switches 2 and 5 are closed, it can be seen that current $-I_{BC}$ flows from bus 104, downwards through switch 5, to the right on conductor 103C, through windings WC and WB in series, to the left on conductor 103B to midpoint B, downward through switch 2 and resistor RB in series to negative bus 102. This current causes a positive signal to be applied by resistor RB to conductor 104B. Switches 2 and 5 are then opened and switches 3 and 6 are closed to cause the current to decay. The current $-I_{BC}$ now in windings WC and WB induces potentials that attempt to continue this current flow. As a consequence, current now flows through closed switches 6 and 3 and their diodes D6 and D3 during the time the current is decaying. On FIG. 1, this current now flows from the negative bus 102 through resistor $R_C$ and develops a negative signal on output conductor 104C. It further flows through switch contacts SW6 and diode D6, over conductor 103C and through the series connected windings $W_C$ and $W_B$, over conductor 103B, and through the parallel path of switch contacts SW3 and diode D3 to positive bus 104. The circuit remains in this state with the current $-I_{BC}$ decaying towards $I_{min}$ following which switches SW3 and SW6 are opened and switches SW2 and SW5 are closed once again to cause the current to rise towards $I_{max}$. The circuit operates in this manner from time T0 to time T1. At time T1, the rotary position of the motor armature has changed to Run Position 2 so it is now desired to cause current $I_{AB}$ to be applied to motor windings $W_B$ and $W_A$. The rise portion of the current $I_{AB}$ is controlled by the closed state of switches 1 and 2 followed by the opening of switches 1 and 2 and the closing of switches 3 and 4 for the decaying portion of current $I_{AB}$. The current $I_{AB}$ is applied between times T1 and T2. Current −$I_{CA}$ is caused to flow serially through windings WC and WA from time T2 until time T3 (Run Portion 3). The indicated switches are closed during the rising portion of this current and the indicated switches are closed during the decaying portion of the current. The motor operation continues in this manner for the rest of the revolution with currents $I_{BC}$, −$I_{AB}$ and $I_{CA}$ being applied to the motor. During each interval on FIG. 2, the indicated switches are controllably closed and opened for the rise and fall states of these currents. Following the end of the application of current $I_{CA}$, the rotor rotates to the position where current −$I_{BC}$ is once again applied.

The operation of the circuit and the motor continues in this manner with the current during each state varying between a minimum value and a maximum value to achieve the desired motor torque. The value of the $I_{CMD}$ (command) current on FIG. 2 may vary depending upon the intended function of the motor. For applications in which it is desired to bring the motor from a standing to a running state in minimum time, the highest possible safe currents are applied to the windings to cause the motor to generate the required torque. In such cases, $I_{CMD}$ as shown on FIG. 2 will be relatively high value and may well approach the maximum permissible current that the motor and the control circuitry devices can tolerate. Once the motor is brought up to speed, a far lesser current and torque is required to keep the motor running. At this time, the value of $I_{CMD}$ on FIG. 2 can be lower than that required for the $I_{CMD}$ for a start up current.

The circuitry operates in a similar manner for the braking state of the motor. In certain applications, it may be desired to stop the motor quickly. At other times, it may be immaterial as to how long it takes. When it is desired to stop the motor in a short time, all of the switches shown in the lower portion of FIG. 1, such as switches 4, 2 and 6, are controllably opened and closed to limit the currents in accordance with the $V_{limit}$ signal on FIG. 3. During this braking period, both positive and negative voltages are induced across sensing resistors RA, RB and RC.

Figure 3:
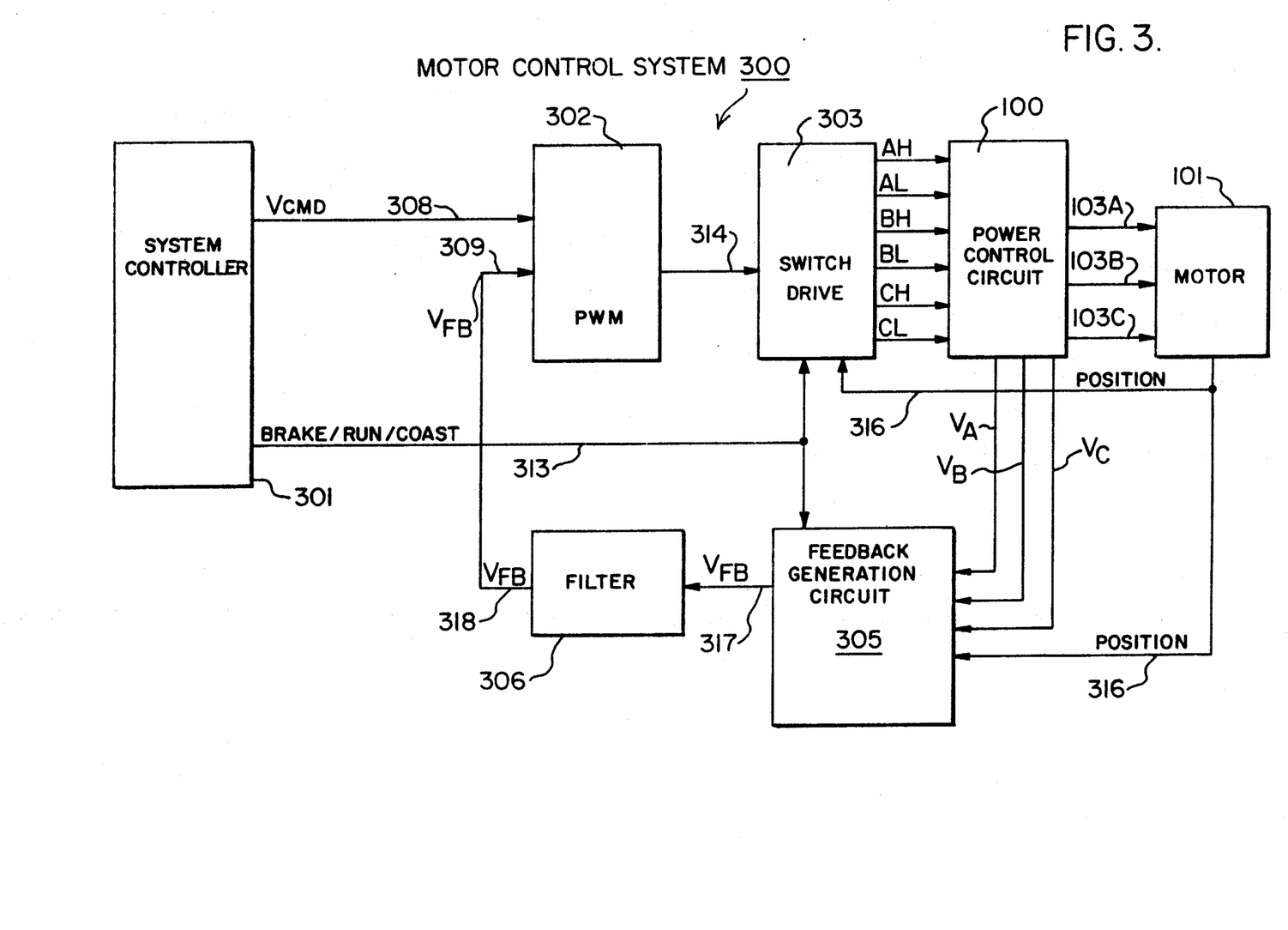
FIG. 3 discloses the details of the motor control system.

FIG. 3 shows a motor control system 300 embodying the present invention. System 300 comprises a system controller 301, pulse width modulator (PWM) 302, switch drive 303, power control circuit 100 and motor 101 of FIG. 1, feedback generation circuit 305, and filter 306. System controller 301 does not comprise a part of the invention since such devices are well known in the art. The function of controller 301 is to apply signals of various types to motor control system 300 to control its operation. These signals include a $V_{limit}$ signal 307 which specifies the absolute upper limits of the currents that can be applied to motor 101 in order to prevent damage to the motor or the elements of power control circuit 100. The $V_{CMD}$ (command) signal 308 specifies the instantaneous current that is to applied to the motor windings to cause the motor to generate the desired torque. The BRAKE/RUN/COAST signal 313 performs three functions. It causes the motor to enter the brake mode when the BRAKE/RUN/COAST signal 313 is of a first value and causes the motor to assume its run mode whenever the BRAKE/RUN/COAST signal 313 is of a second value. It further causes the motor control system 300 to let the motor coast with neither running currents nor braking currents being applied to the motor windings when the BRAKE/RUN/COAST signal 313 is of a third value.

The following describes the operation of the motor control system 300 of FIG. 3. System 300 controls the motor state, such as start, run, stop or coast, as well as the motor torque for each state. System 300 applies signals to the motor to regulate the motor currents that control the acceleration torque, the run torque or the deceleration torque the motor generates. The circuitry of FIG. 3 must operate with precision in order to cause the motor to perform its intended function as well as to protect the motor against damage. For example, it is necessary to protect the drive transistors of power control circuit 100 from excessive currents particularly during motor braking conditions. Means must be provided to limit peak currents, which can cause damage to the motor windings, or demagnetize the rotor magnets, or destroy elements within the motor control system 300. Because torque is a direct result of motor current, it is the current that is the most important parameter that can be controlled externally to cause the motor to perform its intended function as well as to prevent the above characterized damage either to the motor or to other system elements.

In order to achieve this control of the motor currents, it is desirable that the currents in each phase of the motor be monitored with precision. Therefore, the signals that are exchanged between the various elements of system 300 include an indication of the current that is flowing in each motor winding. The various system 300 elements receive these current indication signals and other signals and respond to control the signals that are applied to the other system 300 elements including the currents that are applied to the motor. This either increases or decreases the current in each motor winding so as to cause the motor to achieve the function desired of it.

The pulse width modulator circuit 302 receives the $V_{limit}$ signal 307, the $V_{CMD}$ signal 308, the BRAKE/RUN/COAST signal 313 as well as a $V_{FB}$ (feedback) signal 318. The pulse width modulator 302 receives these four signals and generates a pulse width modulated output signal on path 314. The width of each pulse of signal 314 is proportional to the difference between the level of the $V_{CMD}$ signal and the $V_{FB}$ signal. The greater this difference, the wider the output pulse on path 314 in the run mode. In general, the width of these pulses determines the magnitude of currents that are to be applied to the motor windings.

Signal 314 extends to the input of switch drive circuit 303 which also receives BRAKE/RUN/COAST signal 313. Let it be assumed that signal 313 now indicates that the motor is to operate in the run state. This being the case, switch drive circuit 303 receives an indication on path 313 that the motor is now in the run state. Signal 314 specifies the current that is to be applied to the motor windings and, in turn, the instantaneous torque that motor 101 is to generate. Switch drive circuit 303 receives this pulse width modulated signal 314 and generates signals AH, AL, BH, BL, CH, CL, which are extended to the power control circuit 100 whose details are shown in FIG. 1. These A- B- and C- signals extend to the control input of switches 1 . . . 6 of FIG. 1 to selectively control the on/off states of switches. The switch drive circuit 303 may comprise either a programmable logic element or a microprocessor which responds to input signal 314 and generates the A- B- and C- output signals required by the power control circuit 100. The details of the switch drive circuit comprise no part of the present invention and are therefore not shown herein in further detail.

Table 1 below shows the A- B- C- output signals generated by the switch drive circuit 303 for various system conditions including motor state and position as well as the state of the PWM output signal.

TABLE 1

| Mode | Position | PWM | AH | AL | BH | BL | CH | CL |
|------|----------|-----|-----|-----|-----|-----|-----|-----|
| Run | 1 | 1 | Off | Off | Off | On | On | Off |
| Run | 1 | 0 | Off | Off | On | Off | Off | On |
| Run | 2 | 1 | On | Off | Off | On | Off | Off |
| Run | 2 | 0 | Off | On | On | Off | Off | Off |
| Run | 3 | 1 | On | Off | Off | Off | Off | On |
| Run | 3 | 0 | Off | On | Off | Off | On | Off |
| Run | 4 | 1 | Off | Off | On | Off | Off | On |
| Run | 4 | 0 | Off | Off | Off | On | On | Off |
| Run | 5 | 1 | Off | On | On | Off | Off | Off |
| Run | 5 | 0 | On | Off | Off | On | Off | Off |
| Run | 6 | 1 | Off | On | Off | Off | On | Off |
| Run | 6 | 0 | On | Off | Off | Off | Off | On |
| Brake | — | 1 | Off | On | Off | On | Off | On |
| Brake | — | 0 | Off | Off | Off | Off | Off | Off |
| Coast | — | — | Off | Off | Off | Off | Off | Off |

The following Table 2 describes output signals generated by the feedback generation circuit 305 for various system states.

TABLE 2

| Mode | Position | Controlled Current | Feedback Signal $V_{FB}$ |
|------|----------|--------------------|--------------------------|
| Run | 1 | $-I_{BC}$ | $V_B - V_C$ |
| Run | 2 | $I_{AB}$ | $V_B - B_A$ |
| Run | 3 | $-I_{CA}$ | $V_C - V_A$ |
| Run | 4 | $I_{BC}$ | $V_C - V_B$ |
| Run | 5 | $-I_{AB}$ | $V_A - V_B$ |
| Run | 6 | $I_{CA}$ | $V_A - V_C$ |
| Brake | don't care | i) $-i)\ |V_A|+|V_B|+|V_C|$ ii) max $(|V_A|, |V_B|, |V_C|)$ | |

The above Table 2 describes the $V_{FB}$ signal 318 that is applied to the input of pulse width modulator 302 to cause it to generate the 314 output signal required to cause the motor to generate the required torque. The left column of Table 2 indicates the operational mode of the motor such as run or brake. All but the bottom line of Table 2 indicates the run mode. For the run mode, the motor rotor has six different rotor positions which are related but do not represent necessarily a complete 360° rotation of the motor rotor. For a two pole motor, the six positions together do represent 360°. Each run position for a two pole motor represents a 60° rotation of the rotor. For a four pole motor, the six run positions together represent 180° with each position by itself representing 30°.

Motor 101 applies a position signal on path 316 which indicates the present rotary position of the motor rotor. This indication may be provided by Hall devices which comprise an integral part of such motors as known in the prior art. The position signal 316 is applied on FIG. 3 to feedback generation circuit 305 as well as to switch drive circuit 303. The third column of the chart of Table 2 indicates the currents power control circuit 100 causes to flow through the motor windings for the different run positions. Current $I_{BC}$ in run position 4 corresponds to the counterclockwise current flowing serially through windings B and C as shown on the right side of FIG. 1. Current $-I_{BC}$ shown for run position 1 represents a clockwise current flow through windings C and B. The other currents of Table 2 associated with other motor run positions are similarly designated in a manner to indicate the motor windings involved as well as the direction of the current shown on FIG. 1. The right hand column of Table 2 indicates the feedback signal $V_{FB}$ that is generated by the feedback generation circuit 305 for each run position.

It is shown on FIG. 2 during the interval from time T0 to time T1, that the controlled current is $I_{AB}$ and that the rising portion of this current is brought about by closing switches 1 and 2 and that the decay portion of $I_{AB}$ is brought about by closing switches 3 and 4. On Table 2, it is seen that current $I_{AB}$ is effective during run position 2 and that during this time the feedback signal is $V_B - V_A$. With reference to FIG. 1, and FIG. 2, it is seen that the closure of switches 1 and 2 for the rise time portion of $I_{AB}$ causes current to flow downwards from positive bus 104, through switch 1, through windings $W_A$ and $W_B$, downward through switch 2 and resistor RB to negative bus 102. This current flow through resistor RB applies a voltage $V_B$ to conductor 104B. This signal $V_B$ is applied over path 104B to the feedback generation circuit 305 on FIG. 3. Feedback generation circuit 305 extends this signal as $V_{FB}$ over conductor 317 and through the filter 306 to conductor 318 as a feedback signal to PWM 302. During this interval, signal $V_A=0$ since no current flows through resistor RA. Thus, the signal $V_{FB}$ at this time is the $V_B$ signal developed across resistor $R_B$ as indicated on Table 2 in the right-most column for the line associated with run position 2.

In summary of the above, the feedback signal $V_{FB}$ is equal to the voltage $V_B$ during run position 2 when the current $I_{AB}$ is in the rising mode. Subsequently, as shown on FIG. 2, current $I_{AB}$ approaches its maximum and the controlling circuitry, including power control circuit 100, opens switches 1 and 2 so that current $I_{AB}$ can decay. At this time, the inductances of windings $W_A$ and $W_B$ generate a counter EMF that tends to keep current $I_{AB}$ flowing. These induced voltages cause currents to flow serially from the negative bus 102, through resistor $R_A$, through switch 4, through the windings $W_A$ and $W_B$ and upwards through switch 3 to positive bus 104. This current is in a direction that causes the upper terminal of resistor $R_A$ and voltage $V_A$ to be negative. This negative voltage $V_A$ is applied to feedback generation circuit 305 which, in the manner previously described, causes the $V_{FB}$ signal to change so that it equals $-V_A$ as shown in Table 2 for the line associated with run position 2 and in the right-hand column.

Thus, in summary of the above, for run position 2 and current $I_{AB}$, the feedback signal $V_{FB}$ is equal to $V_B$ during the rising portion of current $I_{AB}$ and is equal to $-V_A$ during the decaying portion of the current. This feedback signal, generated by the feedback generation circuit 305, is ultimately applied via path 318 to the input of the pulse width modulator circuit 302.

Figure 4:
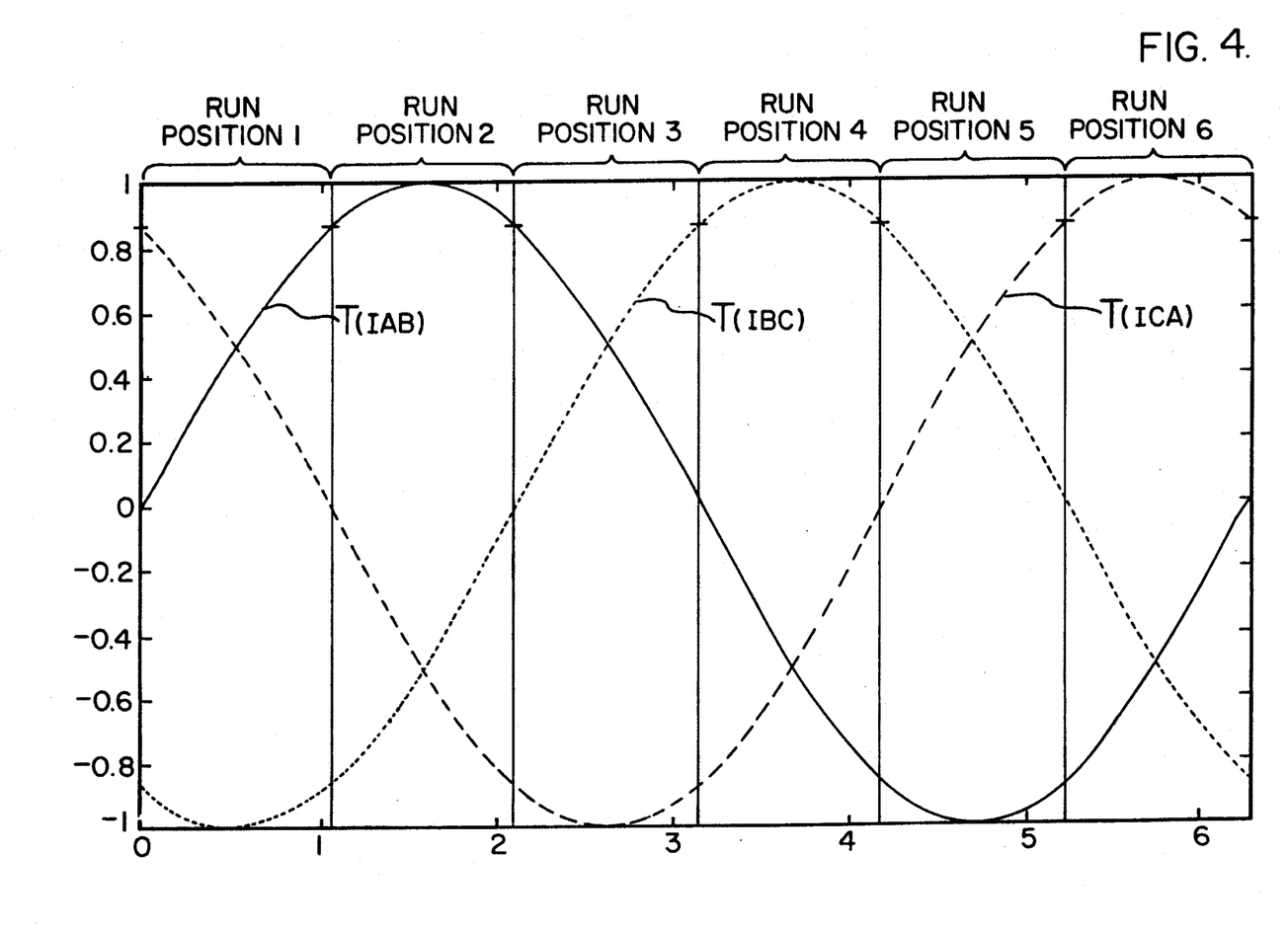
FIG. 4 graphically depicts the relationship between motor torque, the rotor position, and the current in the different motor windings.

FIG. 4 shows the relationship between the various angular run positions of the motor rotor, and the relative torque that would be generated if the shown unit currents were applied to the motor. The exact shape of the curves is a function of the motor design. As previously explained, the angular position of the motor is divided into six segments or run positions which together represent 360° for a two pole motor, 180° for a four pole motor, etc.

For a motor having the torque/angle curve of FIG. 4, during run position 1 it is seen that currents $I_{AB}$ and $I_{CA}$ vary in effectiveness between 0 torque and somewhat greater than 0.8 torque while current $I_{BC}$ is negative and substantially more effective and varies from somewhat greater than $-0.8$ to full $-1$ torque. Therefore, it may be seen that it is far more efficient to generate a current $-I_{BC}$ during motor run position 1 in order to develop maximum motor torque. At this time, the current $-I_{BC}$ is applied the motor. Current $-I_{BC}$ is characterized in the top line of Table 2. The feedback signal $V_{FB}$ is equal to $V_B$ during the rising portion of the current and equal to $-V_C$ during the decay portion of the current. FIG. 4 and Table 2 indicate the current that should be induced in the motor windings during each run position of the motor. Table 2 indicates this statistically while FIG. 4 shows the relationships between motor torque, run position, and winding currents. This relationship can be intuitively observed from FIG. 4 where, beginning with run position 1, it is seen that the most effective current is $-I_{BC}$. For run position 2, the most effective current is $I_{AB}$. For run position 3 the most effective current is $-I_{CA}$. The most effective currents are $I_{BC}$, $-I_{AB}$ and $I_{CA}$ for run positions 4, 5 and 6, respectively. Table 2 indicates the feedback voltages for the rising and decaying portions of each of these currents.

Table 2 also indicates the feedback signal $V_{FB}$ associated with the braking state of the motor. The run position is then immaterial as are the controlling currents as long as they do not exceed the predetermined maximum. The only signal that is then required is a feedback signal $V_{FB}$ to prevent the currents from exceeding a predetermined maximum. At this time, the currents may be equal to one of two values depending upon the circuit designer's choice. The first value is shown in Table 2 as i) and equals the sum of the absolute values of $V_A$, $V_B$ and $V_C$. A second choice of feedback signals is indicated in the next line ii) and is equal to the maximum of the absolute values of $V_A$, $V_B$ and $V_C$. It is immaterial as to which feedback signal is used as long as it is understood that the feedback signal associated with i) is perhaps easier to implement with hardware while the feedback signal ii) gives a more precise control though it is somewhat harder to implement in hardware. The present invention is operable in accordance with either feedback signal for the braking state.

Figure 5:
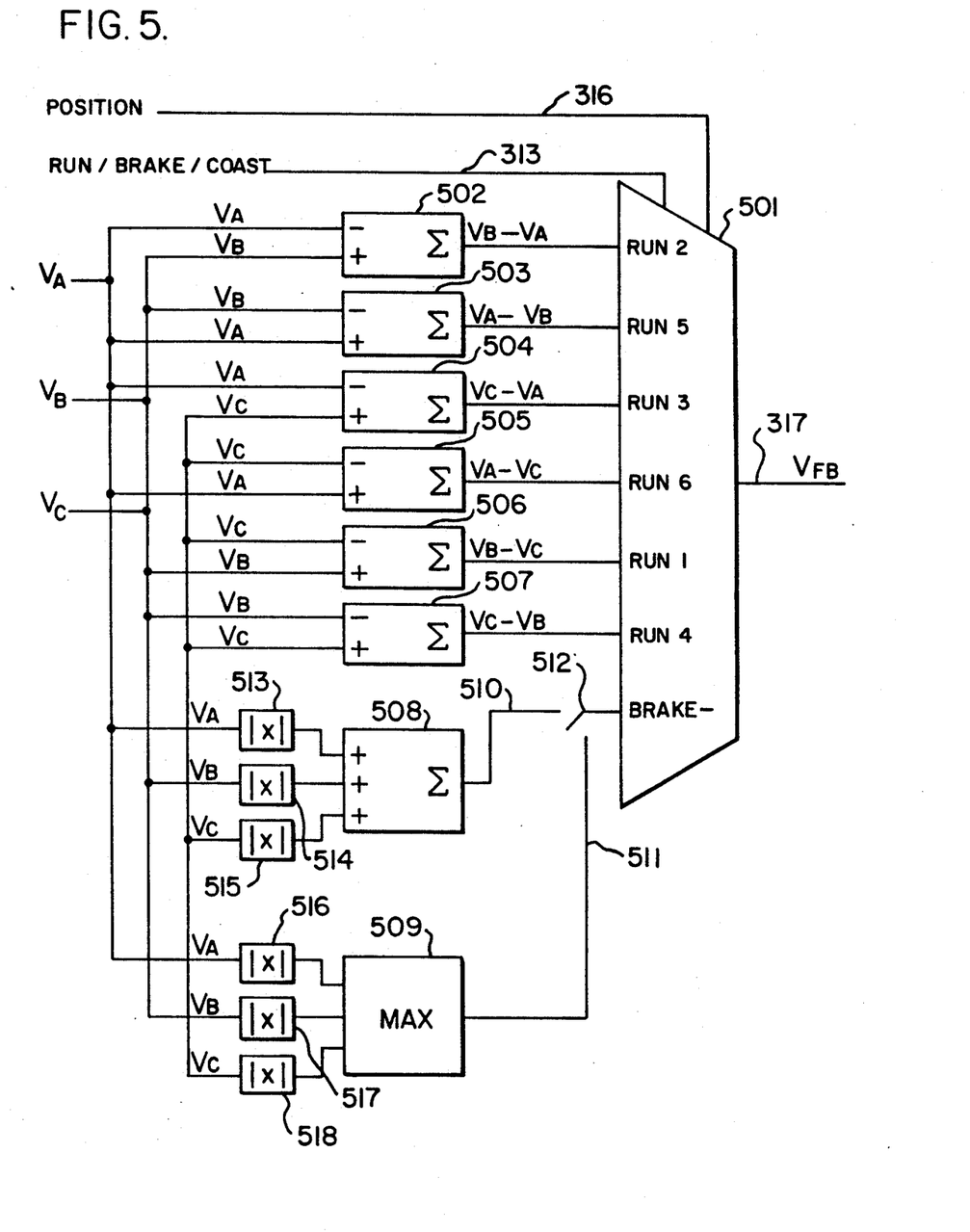
FIG. 5 shows feedback generation circuit of FIG. 3.

Feedback generation circuit 305 may comprise a plurality of operational amplifiers and a multiplexer operating to produce the indicated feedback signal $V_{FB}$ in response to the indicated feedback signals $V_A$, $V_B$ and $V_C$ from power control circuit 100 together with position signal 316 received from the motor and brake signal 313. FIG. 5 discloses further details of feedback generation circuit 305. The overall function of this circuit is to receive the three separate feedback signals $V_A$, $V_B$ and $V_C$ to combine them in an appropriate manner to generate an output signal $V_{FB}$ which is extended over path 317 via filter 306 and path 318 to the input of the pulse width modulator 302. Feedback generation circuit 305 on FIG. 5 comprises a multiplexer 501 whose output 317 extends the signal $V_{FB}$ to filter 306. Multiplexer 501 has a plurality of operative positions designated run1 .. . run6 and brake. The operative position of the multiplexer is selected by position signal 316 and by RUN/-BRAKE/COAST signal 313. Paths 316 and 313 may comprise multi-bit paths having a number of bits sufficient to cause the multiplexer 501 to assume any selected one of its operative positions.

Each operative position of the multiplexer has an input to which is applied the signal developed by the blocks 502 ... 509. Input signals $V_A$, $V_B$, and $V_C$, from power control circuit 100 are applied to the inputs of elements 502 through 507 and applied via elements 513 through 518 to elements 508 and 509.

The inputs of multiplexer 501 are associated with the different run positions shown on Table 2 and the input signal associated with each run position is shown in the right-hand column of Table 2. Thus, for run position 2, feedback voltages $V_A$ and $V_B$ are applied to the input of element 502 which generates output signal $V_B - V_A$ on conductor 317 and applies it to the input of the multiplexer associated with run positioin 2. At this time, conductors 313 and 316 cause the multiplexer 501 to be in its operative position associated with run position 2. This extends the signal $V_B - V_A$ to conductor 317. This signal represents the feedback signal that is applied to pulse-width modulator 302 at this time.

Elements 503 through 507 receive various combinations of input voltages $V_A$, $V_B$, and $V_C$, and generate the output signals indicated on FIG. 5. Elements 508 and 509 receive the absolute values of $V_a$, $V_B$, and $V_C$ and generate the output signals indicated on the right-hand column of Table 2. Element 508 generates the run of the absolute value of these three input signals while element 509 generates an output signal which represents the maximum of the absolute values of these three input signals. Switch 512 may either comprise a separately controlled switch or two separate brake inputs of the multiplexer to which conductors 510 or 511 are connected. This permits the user of the system to specify the manner in which the feedback signal is to be characterized for the brake mode of the system.

Power control circuit 100, which is shown in detail on FIG. 1, receives the control signals A-, B- and C- from switch drive circuit 303 as the motor armature rotates through its run positions and uses these control signals to open and close the switches 1 ... 6 as shown in detail on FIG. 2 to generate the winding currents indicated on Table 2 for each indicated motor run position. The motor responds to these currents to generate a motor torque controlled by the magnitude of these currents.

The motor generates a position signal at all times indicating the rotary position of its armature and applies these on path 316 to feedback generation circuit 305. At the same time, power control circuit 100 generates feedback signals $V_A$, $V_B$ and $V_C$ which are extended to feedback generation circuit 305. Circuit 305 causes an output voltage $V_{FB}$ to be generated which is applied back to the input of pulse modulator 302. This $V_{FB}$ signal is used by pulse width modulator 302 to dynamically control and monitor whether the appropriate currents are being applied to the motor windings to cause the motor to generate the motor torque specified by signal $V_{CMD}$.

All signals applied to PWM 302 are interdependent so that when an input signal $V_{CMD}$ is received specifying a given motor torque, the elements of FIG. 3 operate to induce motor winding currents that are of a magnitude required to generate the torque specified by the instantaneous value of input signal $V_{CMD}$. If the $V_{CMD}$ signal should suddenly rise to specify an increased torque, the elements of FIG. 3 respond and cause increase motor currents to be induced in the windings of motor 101. Similarly, if input signal $V_{CMD}$ instantaneously changes to specify a lower torque, the elements of system 300 cooperate to cause decreased currents to be induced in the windings of motor 101.

Feedback filter 306 receives the output signal 317 of feedback generation circuit 305 and alters its characteristic so as to apply a output signal $V_{FB}$ on path 318 of the type required by pulse width modulator circuit 302. Filter 306 is an interface between feedback generation circuit 305 and pulse width modulator 302. Its details are not shown herein since they comprise no portion of the present invention. Their details are specific to the circuitry used to implement feedback generation circuit 305 and pulse width modulator 302.

In summary, the system of FIG. 300 controls the magnitude of the motor winding currents in accordance with the magnitude of the instantaneous torque specified by input signal $V_{CMD}$. The only exception is that the currents that are applied to the motor windings are limited by signal $V_{limit}$ applied over path 307 to the input of pulse width modulator 302. This $V_{limit}$ signal represents an upper current limit that can not be exceeded under any circumstances. This limit is necessary in order to protect various elements of motor control system 300 as well as the various elements of motor 101 including its windings and its magnetized rotor.

It can be seen in view of the above that the present invention provides an improved method and apparatus for controlling with precision the currents induced in windings of a brushless DC motor by monitoring the instantaneous magnitude and polarity of all winding currents in order to cause the motor to generate the torque demanded by the input signal $V_{CMD}$. This monitoring of motor winding currents represents an improvement over the prior art which did not permit the monitoring of bi-directional currents in the individual phases of the motor in a manner.

While a specific embodiment of this invention has been disclosed herein, it is expected that those skilled in the art can design other embodiments that differ from this particular embodiment but fall within the scope of the following claims.

We claim:

1. Apparatus for controlling the magnitude of currents in a plurality of windings of a multiphase brushless dc motor having a plurality of run positions, said apparatus comprising:
    means effective during each of said run positions for alternately applying unique currents of controlled increasing and decreasing magnitudes to a selected pair of said windings,
    a plurality of sensing resistors each of which is associated with a different one of said windings for monitoring said currents in said windings,
    means effective during each of said run positions for generating positive and negative sensing voltages across different ones of said sensing resistors in response to said application of said currents to said selected ones of said windings with the magnitude of each sensing voltage representing the magnitude of the current in the winding associated with the resistor across which said each sensing voltage is generated,
    a feedback generation circuit having a plurality of summing means each of which is individual to a different one of said run positions,
    means effective during each of said run positions for applying said positive and negative sensing voltages to the summing means associated with said each run position,
    said feedback generation circuit being responsive to the application of said positive and negative sensing voltages applied during each of said run positions to generate a system feedback voltage for each run position, and
    means, including said means for applying said unique currents, responsive to said generation of said system feedback voltage for said each run position for controlling the magnitude of said currents in said motor windings during said each run position.

2. The apparatus of claim 1 wherein said means for applying said unique currents comprises:
    a positive potential source and a negative potential source,
    means effective during each of said run positions for applying a potential of a first polarity across a series connection of two of said windings to generate a current of an increasing magnitude in said two series connected windings until said current reaches a predetermined magnitude and
    means effective during each run position when said current reaches the predetermined magnitude for removing said potential of said first polarity and applying a potential of an opposite polarity from said sources across said two series connected windings to decrease said current in said two series connected windings toward a predetermined minimum.

3. Apparatus for controlling the magnitude of currents in n windings of a multiphase brushless dc motor having 2n run positions, each of which represents a unique rotational position of said motor, each of said windings having an inner end connected in common to an inner end of each other winding, each of said windings also having an outer end, said apparatus comprising:
    n current supply sources each including a pair of series connected switches connected between a positive potential source and a negative potential source,
    each of said switch pairs being individual to and connected at their midpoint to an outer end of a different one of said windings,
    means effective during each of said run positions for sequentially closing a first and a second one of said switches of different pairs concurrently and subsequently opening said first and second switches and closing a third and a fourth one of said switches of different pairs concurrently for alternately applying a current having an increasing and a decreasing controlled magnitude to a pair of said windings associated with said each run position,
    said switches being effective during each run position for applying a potential of a first polarity across a series connection of two of said windings to generate a current of an increasing magnitude in said two series connected windings,
    said switches being further effective during each run position for applying a potential of an opposite polarity across said two series connected windings to decrease the current in said two series connected windings,
    a sensing resistor in each of said sources connected to a switch of each source,
    means effective during each of said run positions for generating positive and negative sensing voltages across different ones of said sensing resistors in response to said current in the ones of said windings associated with said each run position, a feedback generation circuit having a plurality of summing means each of which is individual to a different one of said run positions, means effective during each of said run positions for applying said positive and negative sensing voltages to the summing means associated with said each run position, said feedback generation circuit being responsive to the application of said positive and negative sensing voltages applied during each of said run positions to generate a system feedback voltage for each run position, and means, including said means for sequentially closing, responsive to said generation of said system feedback voltage for said each run position for controlling the magnitude of currents in said motor windings during said each run position.

4. The apparatus of claim 3 wherein the ratio of the time duration that said current increases compared to the time duration that said current decreases during each run position controls both the direction of rotation of said motor as well as whether said motor is operated in a motoring or a regenerative mode.

5. Apparatus for controlling the magnitude of currents in each of a plurality of series connected windings of a multiphase brushless dc motor having a plurality of run positions, said apparatus comprising:

a plurality of pairs of series connected switches with each pair being connected between a positive bus and a negative bus, each of said switch pairs being individual to a different winding of said motor, means connecting a midpoint of each of said series connected switch pairs to an outer end of the winding to which said each switch pair is individual, each of said windings having an inner end connected to the inner end of each other winding so as to enable different pairs of said windings to be connected in series at different times as said motor is operated, a plurality of sensing resistors each of which is connected between said negative bus and a first one of the switches of each of said pairs, a switch driver for controlling the opening and closing of said switches to apply currents of controlled magnitudes to said windings, means, including said switch driver, effective during each of said run positions for controllably closing a first one of said switches of a first pair and a second one of said switches of a second pair to apply a current having an increasing magnitude to a first and a second one of said windings to which said closed switches are connected, said sensing resistor connected to said first switch of said first pair being responsive to said increasing current to generate a positive sensing voltage across said sensing resistor, means, including said switch driver, effective when said current reaches a predetermined magnitude for opening said first switch of said first pair and said second switch of said second pair to terminate the increasing of said current in said first and second windings, means, including said switch driver, further effective when said current reaches the predetermined magnitude for closing a second switch of said first pair and a first switch of said second pair to cause the current in said first and second windings to decay toward a predetermined minimum, means responsive to said decaying current for generating a negative sensing voltage across a sensing resistor connected to said first switch of said second pair, means for applying said positive and negative sensing voltages to a feedback generation circuit for the generation of a system feedback voltage, said feedback generation circuit having a plurality of summing means each of which is individual to a different one of said motor run positions, and regulating means responsive to the generation of said system feedback voltage for controlling the operation of said switch driver in the opening and closing of said switches.

6. The apparatus of claim 5 wherein said regulating means further comprises:

means effective during each of said run positions for applying said sensing voltages to the summing means associated with each said run position, said summing means being responsive to the application of said sensing voltages to generate said system feedback voltage, and means responsive to the generation of said system feedback voltage for applying a motor winding current magnitude control signal to said switch driver.

7. The apparatus of claim 6 wherein the ratio of the time duration that said current increases compared to the time duration that said current decreases for each run position controls both the direction of rotation of said motor as well as whether said motor is operated in a motoring or a regenerative state.

8. A method of controlling the magnitude of currents in each of a plurality of windings of a multiphase brushless dc motor having a plurality of run positions, said method comprising the steps of:

applying unique currents of controlled alternatively increasing and decreasing magnitudes to a selected pair of said windings during each of said run positions, extending, during each of said run positions, said currents in said windings through a plurality of sensing resistors, each of which is associated with a different one of said windings, generating, during each of said run positions, positive and negative sensing voltages across different ones of said sensing resistors in response to said application of said currents to said selected pair of said windings with the magnitude of each sensing voltage representing the magnitude of the current in the winding associated with the resistor across which each said sensing voltage is generated, applying said positive and negative sensing voltages to a feedback generation circuit having a plurality of summing means, each of which is individual to a different one of said run positions so that each summing means receives said positive and negative sensing voltages generated during its associated run position, said feedback generation circuit being responsive to the application of said sensing voltages to generate a system feedback voltage for each run position, and controlling the magnitude of currents in said motor windings in response to said generation of said system feedback voltage.

9. The method of claim 8 wherein said step of applying said unique currents comprises the steps of:
applying, during each of said run positions, a potential of a first polarity across a series connection of two of said windings to generate a current of an increasing magnitude in said two series connected windings until said current reaches a predetermined magnitude and
removing, during each run position when said current reaches the predetermined magnitude, said potential of said first polarity and applying a potential of an opposite polarity across said two series connected windings to decrease said current in said two series connected windings toward a predetermined minimum.

10. A method of controlling the magnitude of currents in n windings of a multiphase brushless dc motor having 2n run positions each of which represents a unique rotational position of said motor, each of said windings having an inner end connected in common to an inner end of each other winding, each of said windings also having an outer end, said method comprising the steps of:
connecting n current supply sources, each including a pair of series connected switches, between a positive potential source and a negative potential source, each of said switch pairs being individual to and connected at their midpoint to an outer end of a different one of said windings,
during each of said run positions, sequentially closing a first and a second one of said switches of different pairs concurrently,
subsequently opening said first and second switches of said different pairs and closing a third and a fourth one of said switches of different pairs concurrently for alternatively applying a current having an increasing and a decreasing controlled magnitude to a pair of said windings associated with said each run position,
applying a potential of a first polarity across a series connection of two of said windings to generate a current of an increasing magnitude in said two series connected windings at each run position by said switches,
applying a potential of an opposite polarity across said two series connected windings to decrease the current in said two series connected windings at each run position by said switches,
generating positive and negative sensing voltages across different ones of a sensing resistor connected to a switch of each source in response to said current in the ones of said windings associated with said each run position,
during each of said run positions, applying said positive and negative sensing voltages to a feedback generation circuit having a summing means unique to and associated with said each run position,
said feedback generation circuit being responsive to the application of said positive and negative sensing voltages applied during each of said run positions to generate a system feedback voltage for each run positions, and
applying said potential sources to said motor windings responsive to said generation of said system feedback voltage for said each run position for controlling the magnitude of currents in said motor windings.

11. The method of claim 10 wherein the ratio of the time that said current increases compared to the time that said current decreases during each run position controls both the direction of rotation of said motor as well as whether said motor is operated in a motoring or a regenerative state.

12. A method of operating apparatus for controlling the magnitude of currents in each of a plurality of windings of a multiphase brushless dc motor having a plurality of run positions, said method comprising the steps of:
connecting a plurality of pairs of series connected switches between a positive bus and a negative bus with each of said switch pairs being individual to a different winding of said motor,
connecting a midpoint of each of said series connected switch pairs to an outer end of the winding to which said each pair is individual,
each of said windings having an inner end connected to the inner end of each other winding,
connecting each of a plurality of sensing resistors between said negative bus and a first one of the switches of each of said pairs,
controllably closing a first one of said switches of a first pair and a second one of said switches of a second pair to apply a current having an increasing magnitude to a first and a second one of said windings to which said closed switches are connected,
generating a positive sensing voltage across said sensing resistor connected to said closed switch of said first pair in response to said increasing current,
opening said first switch of said first pair and said second switch of said second pair to terminate the increasing of said current in said first and second windings when said current reaches a predetermined magnitude,
closing a first switch of said second pair and a second switch of said first pair for causing said current in said first and second windings to decay towards a predetermined minimum,
generating a negative sensing voltage across said resistor connected to said first switch of said second pair in response to said decaying current,
applying said positive and negative sensing voltages to a feedback generation circuit for the generation of a system feedback voltage, said feedback generation circuit having a plurality of summing means each of which is individual to a different one of said motor run positions, and
regulating the operation of a switch driver to control the opening and closing of said switches in response to the generation of said system feedback voltages.

13. The method of claim 12 wherein said step of regulating comprises the steps of:
applying said positive and negative sensing voltages generated during each run position to said feedback generation circuit having said plurality of summing means,
said feedback generation circuit being responsive to the application of said positive and negative sensing voltages generated during each run position to generate the system feedback voltage, and
applying a winding current magnitude control signal to said switch driver in response to the generation of said system feedback voltage.

14. The method of claim 13 wherein the ratio of the time duration that said current increases compared to the time duration that said current decreases for each run position controls both the direction of rotation of said motor as well as whether said motor is operated in a motoring or a regenerative state.

* * * * *